United States Patent
Kini et al.

(10) Patent No.: US 11,637,957 B2
(45) Date of Patent: Apr. 25, 2023

(54) METHOD AND ELECTRONIC DEVICE FOR SWITCHING BETWEEN FIRST LENS AND SECOND LENS

(71) Applicant: SAMSUNG ELECTRONICS CO., LTD., Suwon-si (KR)

(72) Inventors: Ravi Prasad Mohan Kini, Karnataka (IN); Gururaj Bhat, Karnataka (IN); Pavan Sudheendra, Karnataka (IN); Girish Kulkarni, Karnataka (IN); Vineeth Thanikonda Munirathnam, Karnataka (IN); Sanjay Narasimha Murthy, Karnataka (IN); Balvinder Singh, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/599,761

(22) Filed: Oct. 11, 2019

(65) Prior Publication Data

US 2020/0120284 A1 Apr. 16, 2020
US 2022/0086352 A9 Mar. 17, 2022

(30) Foreign Application Priority Data

Oct. 12, 2018 (IN) .............................. 201841038833
Oct. 7, 2019 (IN) .............................. 201841038833

(51) Int. Cl.
*H04N 5/232* (2006.01)
*G02B 15/14* (2006.01)
(Continued)

(52) U.S. Cl.
CPC ......... *H04N 5/23296* (2013.01); *G02B 15/14* (2013.01); *H04N 5/2259* (2013.01);
(Continued)

(58) Field of Classification Search
CPC ............. H04N 5/23296; H04N 5/2259; H04N 5/23245; H04N 5/232933; H04N 5/2628;
(Continued)

(56) References Cited

U.S. PATENT DOCUMENTS 7,683,962 B2 3/2010 Border et al.
8,619,198 B1* 12/2013 Andreev ................. G11B 27/28
375/240.26
(Continued)

FOREIGN PATENT DOCUMENTS

CN 104539942 A 4/2015
CN 105308947 A 2/2016
(Continued)

OTHER PUBLICATIONS

International Search Report (PCT/ISA/210) dated Jan. 22, 2020 issued by the International Searching Authority in International Application No. PCT/KR2019/013388.
(Continued)

*Primary Examiner* — Luong T Nguyen
(74) *Attorney, Agent, or Firm* — Sughrue Mion, PLLC

(57) ABSTRACT

A method for switching between a first lens and a second lens in an electronic device includes displaying, by the electronic device, a first frame showing a field of view (FOV) of the first lens; detecting, by the electronic device, an event that causes the electronic device to transition from displaying the first frame to displaying a second frame showing a FOV of the second lens; generating, by the electronic device and based on the detecting the event, at least one intermediate frame for transitioning from the first frame to the second frame; and switching, by the electronic device and based on the detecting the event, from the first lens to the second lens and displaying the second frame, wherein the at least one intermediate frame is displayed after
(Continued)

the displaying the first frame and before the displaying the second frame while the switching is performed.

16 Claims, 16 Drawing Sheets

(51) Int. Cl.
*H04N 5/225* (2006.01)
*G02B 13/00* (2006.01)

(52) U.S. Cl.
CPC ....... *H04N 5/23245* (2013.01); *G02B 13/009* (2013.01); *G02B 13/0015* (2013.01)

(58) Field of Classification Search
CPC ...... H04N 5/247; H04N 5/2351; G02B 15/14; G02B 13/009; G02B 13/0015
See application file for complete search history.

(56) References Cited

U.S. PATENT DOCUMENTS

| | | | |
|---|---|---|---|
| 9,118,826 B2* | 8/2015 | Griffith | ................ H04N 5/2251 |
| 9,185,291 B1 | 11/2015 | Shabtay et al. | |
| 2007/0025713 A1 | 2/2007 | Hosono | |
| 2013/0177080 A1* | 7/2013 | Nakashima | .......... H04N 19/521 |
| | | | 375/240.14 |
| 2015/0097981 A1 | 4/2015 | Griffith et al. | |
| 2016/0028949 A1* | 1/2016 | Lee | ........................... G06T 3/40 |
| | | | 348/218.1 |
| 2016/0050374 A1 | 2/2016 | Shabtay et al. | |
| 2016/0057344 A1* | 2/2016 | Chang | ................ H04N 5/23216 |
| | | | 348/38 |
| 2016/0360121 A1* | 12/2016 | Cheng | .................. H04N 13/239 |
| 2017/0230585 A1* | 8/2017 | Nash | ......................... G06T 5/50 |
| 2017/0272650 A1* | 9/2017 | Lee | ..................... H04N 5/23229 |
| 2019/0236794 A1 | 8/2019 | Nash et al. | |
| 2020/0013231 A1* | 1/2020 | Maitlen | ................... G06T 19/20 |

FOREIGN PATENT DOCUMENTS

| | | |
|---|---|---|
| CN | 106331524 A | 1/2017 |
| CN | 108604373 A | 9/2018 |
| JP | 4651745 B2 | 3/2011 |
| KR | 10-2017-0020069 A | 2/2017 |
| WO | 2014/199338 A2 | 12/2014 |
| WO | 2017/025822 A1 | 2/2017 |
| WO | 2017/115179 A1 | 7/2017 |

OTHER PUBLICATIONS

Written Opinion (PCT/ISA/237) dated Jan. 22, 2020 issued by the International Searching Authority in International Application No. PCT/KR2019/013388.
Communication dated May 11, 2021, issued by the European Patent Office in counterpart European Application No. 19870410.8.
Communication dated Jan. 31, 2021 issued by the Intellectual Property India Patent Office in English application No. 201841038833.
Communication dated Jul. 5, 2022 issued by the State Intellectual Property Office of P.R. China in counterpart Chinese application No. 201980067152.4.

* cited by examiner

METHOD AND ELECTRONIC DEVICE FOR SWITCHING BETWEEN FIRST LENS AND SECOND LENS

CROSS-REFERENCE TO RELATED APPLICATIONS

This application is based on and claims priority under 35 U.S.C. § 119 to an Indian Provisional Patent Application No. 201841038833 filed on Oct. 12, 2018 and an Indian Complete Patent Application No. 201841038833, filed on Oct. 7, 2019, the disclosures of which are incorporated by reference herein in their entirety.

BACKGROUND

1. Field

The disclosure relates to an image processing system, and more specifically is related to a method and electronic device for switching between a first lens and a second lens.

2. Description of Related Art

In general, flagship features like dual and triple cameras are being introduced in an electronic device (e.g., smart phone or the like). But there are various constraints in the implementation of the flagship features. One major constraint is that, all camera systems cannot be simultaneously kept turned on, which causes a camera switching delay. The transition between the cameras is not seamless which results in reducing the user experience.

In the existing methods, switching from one camera to another camera may be performed when frames from both cameras are available during transition. A multi frame fusion module combines information from the frames and sends a resulting frame to a display for preview. This also results in reducing the user experience.

Thus, it is desired to address the above mentioned disadvantages or other shortcomings or provide a useful alternative.

SUMMARY

In accordance with an aspect of the disclosure, a method for switching between a first lens and a second lens in an electronic device includes displaying, by the electronic device, a first frame showing a field of view (FOV) of the first lens; detecting, by the electronic device, an event that causes the electronic device to transition from displaying the first frame to displaying a second frame showing a FOV of the second lens; generating, by the electronic device and based on the detecting the event, at least one intermediate frame for transitioning from the first frame to the second frame; and switching, by the electronic device and based on the detecting the event, from the first lens to the second lens and displaying the second frame, wherein the at least one intermediate frame is displayed after the displaying the first frame and before the displaying the second frame while the switching is performed.

The generating the at least one intermediate frame may include determining a lens switching delay from a first time at which the first frame is displayed to a second time at which the second frame is displayed; identifying at least one transition parameter of the first lens and the second lens to generate the at least one intermediate frame; obtaining at least one from among a spatial alignment data, a photometric alignment data and a color alignment data of the first lens and the second lens; and generating the at least one intermediate frame based on the at least one transition parameter, the lens switching delay, and at least one from among the spatial alignment data, the photometric alignment data and the color alignment data.

The at least one intermediate frame may be at least one from among spatially aligned with respect to the first frame and the second frame, photometrically aligned with respect to the first frame and the second frame and color aligned with respect to the first frame and the second frame.

The method may further include determining the at least one intermediate frame to be generated, wherein determining the at least one intermediate frame to be generated includes determining the spatial alignment data using the at least one transition parameter; and determining the at least one intermediate frame to be generated based on the determined spatial alignment data and the at least one transition parameter.

The spatial alignment data is obtained by capturing a first single frame associated with the first lens and a second single frame of a same scene associated with the second lens when the electronic device is in an idle mode; resizing the first single frame and the second single frame into a preview resolution size; computing feature points in the first single frame and the second single frame; computing a transformation matrix using a Homography relationship between the first single frame and the second single frame, wherein the transformation matrix includes a first scaling of the first single frame, a second scaling of the second single frame, a first rotation of the first single frame, a second rotation of the second single frame, a first translation of the first single frame, and a second translation of the second single frame; and obtaining the spatial alignment data using the transformation matrix.

The photometric alignment data may be obtained by computing a transformation matrix for the generated at least one intermediate frame; computing a correction factor based on the transformation matrix; and obtaining the photometric alignment data based on the correction factor.

The color alignment data may be obtained by computing a transformation matrix for the generated at least one intermediate frame; computing a correction factor for the color alignment data based on the transformation matrix; and obtaining the color alignment data based on the correction factor.

The at least one transition parameter may include an F-value of the first lens, the FOV of the first lens, a color profile of the first lens, a saturation profile of the first lens, an F-value of the second lens, the FOV of the second lens, a color profile of the second lens, a saturation profile of the second lens, a scale factor of the first lens, a scale factor of the second lens, a scale factor between the first lens and the second lens, a single scale factor of a combination of the first lens and the second lens, a pivot between the first lens and the second lens, and a single pivot value of a combination of the first lens and the second lens.

In accordance with an aspect of the disclosure, an electronic device for switching between a first lens and a second lens includes a memory; a processor coupled with the memory, the processor being configured to display a first frame showing a field of view (FOV) of the first lens; detect an event that causes the electronic device to transition from displaying the first frame to displaying a second frame showing a FOV of the second lens; generate, based on detecting the event, at least one intermediate frame for transitioning from the first frame to the second frame; and switch, based on detecting the event, from the first lens to the second lens and display the second frame, wherein the at least one intermediate frame is displayed after the first frame is displayed and before the second frame is displayed while the switching is performed.

The processor may be further configured to determine a lens switching delay from a first time at which the first frame is displayed to a second time at which the second frame is displayed; identify at least one transition parameter of the first lens and the second lens to generate the at least one intermediate frame; obtain at least one from among a spatial alignment data, a photometric alignment data and a color alignment data of the first lens and the second lens; and generate the at least one intermediate frame based on the at least one transition parameter, the lens switching delay, and at least one from among the spatial alignment data, the photometric alignment data and the color alignment data.

The at least one intermediate frame may be at least one from among spatially aligned with respect to the first frame and the second frame, photometrically aligned with respect to the first frame and the second frame and color aligned with respect to the first frame and the second frame.

The processor may be further configured to determine the spatial alignment data using the at least one transition parameter; and determine the at least one intermediate frame to be generated based on the determined spatial alignment data and the at least one transition parameter.

The processor may be further configured to capture a first single frame associated with the first lens and a second single frame of a same scene associated with the second lens when the electronic device is in an idle mode; resize the first single frame and the second single frame into a preview resolution size; compute feature points in the first single frame and the second single frame; compute a transformation matrix using a Homography relationship between the first single frame and the second single frame, wherein the transformation matrix includes a first scaling of the first single frame, a second scaling of the second single frame, a first rotation of the first single frame, a second rotation of the second single frame, a first translation of the of the first single frame, and a second translation of the second single frame; and obtain the spatial alignment data using the transformation matrix.

The photometric alignment data may be obtained by computing a transformation matrix for the generated at least one intermediate frame; computing a correction factor based on the transformation matrix; and obtaining the photometric alignment data based on the correction factor.

The color alignment data may be obtained by computing a transformation matrix for the generated at least one intermediate frame; computing a correction factor for the color alignment data based on the transformation matrix; and obtaining the color alignment data based on the correction factor.

The at least one transition parameter may include an F-value of the first lens, the FOV of the first lens, a color profile of the first lens, a saturation profile of the first lens, an F-value of the second lens, the FOV of the second lens, a color profile of the second lens, a saturation profile of the second lens, a scale factor of the first lens, a scale factor of the second lens, a scale factor between the first lens and the second lens, a scale factor of a combination of the first lens and the second lens, a pivot between the first lens and the second lens, and a single pivot value of a combination of the first lens and the second lens.

In accordance with an aspect of the disclosure, a device includes a memory configured to store a first attribute of a first camera and a second attribute of a second camera; and a processor configured to generate at least one intermediate image frame based on the first attribute and the second attribute; output the at least one intermediate image frame after outputting a first image frame captured by the first camera and before outputting a second image frame captured by the second camera.

The memory may be further configured to store at least one transition parameter based on the first attribute and the second attribute, and the processor may be further configured to generate the at least one intermediate image frame based on the at least one transition parameter.

The first image frame captured by the first camera and the second image frame captured by the second camera may be of a same scene, and the processor may be configured to generate a transformation matrix based on a Homography relationship between the first image frame and the second image frame, the Homography relationship being determined based on the at least one transition parameter, and generate the at least one intermediate image frame using the transformation matrix.

The processor may be further configured to determine a coefficient for each intermediate image frame from among the at least one intermediate image frame and generate each intermediate image frame based on the transformation matrix and on the respective determined coefficient.

The memory may be further configured to store a switching delay between the first camera and the second camera and a frame rate, and the processor may be further configured to determine the respective determined coefficient based on the switching delay and the frame rate.

The first image frame captured by the first camera and the second image frame captured by the second camera may be of a same scene, and the processor may be further configured to generate a photometric alignment coefficient based on the at least one transition parameter and generate the at least one intermediate image frame using the photometric alignment coefficient.

The processor may be further configured to determine a transition coefficient for each intermediate image frame from among the at least one intermediate image frame and generate each intermediate image frame based on the photometric alignment coefficient and on the respective determined transition coefficient.

The memory may be further configured to store a switching delay between the first camera and the second camera and a frame rate, and the processor may be further configured to determine the respective determined transition coefficient based on the switching delay and the frame rate.

The first image frame captured by the first camera and the second image frame captured by the second camera may be of a same scene, and the processor may be further configured to generate a color alignment coefficient based on the at least one transition parameter and generate the at least one intermediate image frame using the color alignment coefficient.

The processor may be further configured to determine a transition coefficient for each intermediate image frame from among the at least one intermediate image frame and generate each intermediate image frame based on the color alignment coefficient and on the respective determined transition coefficient.

The memory may be further configured to store a switching delay between the first camera and the second camera and a frame rate, and the processor may be further configured to determine the respective determined transition coefficient based on the switching delay and the frame rate.

BRIEF DESCRIPTION OF FIGURES

The above and other aspects, features, and advantages of certain embodiments of the present disclosure will be more apparent from the following description taken in conjunction with the accompanying drawings, in which.

DETAILED DESCRIPTION

Figure 1:
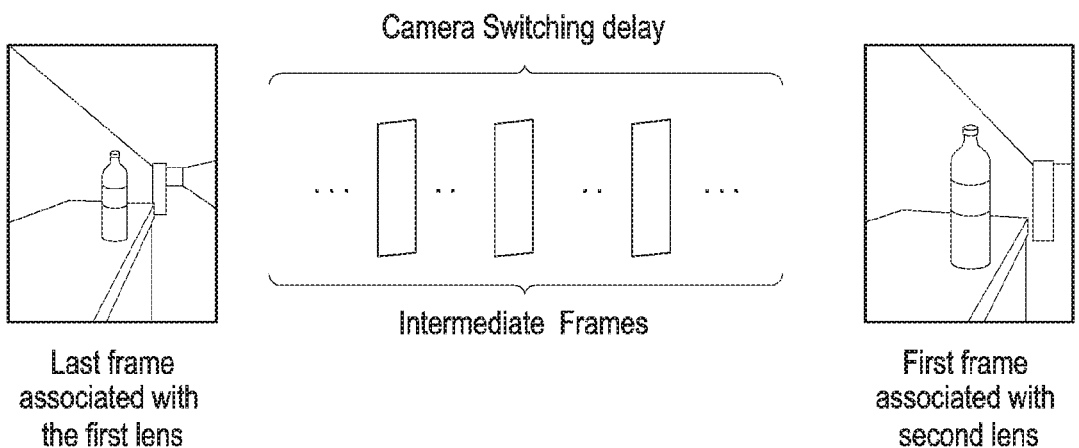
FIG. 1 is an example illustration in which an electronic device switches between a first lens and a second lens, according to an embodiment.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly embodiments herein achieve a method for switching between a first lens and a second lens in an electronic device. The method includes displaying, by the electronic device, a first frame showing a field of view (FOV) of the first lens. Further, the method includes detecting, by the electronic device, an event to switch from the first lens to the second lens. Further, the method includes generating, by the electronic device, at least one intermediate frame for smooth transformation from the first frame to a second frame showing a FOV of the second lens. Further, the method includes switching, by the electronic device, from the first lens to the second lens and displaying the second frame showing the FOV of the second lens. The at least one intermediate frame is displayed between the first frame and the second frame while the switching is performed.

Unlike conventional methods and systems, the electronic device generates intermediate frames based on offline information computed relating to spatial transformation, photometric and color alignment. The generated frames smoothly transform between the first lens preview (i.e., source lens preview) to a second lens preview (i.e., destination lens preview). The electronic device utilizes the source frame, offline spatial alignment data, photometric data and color alignment data to perform this transformation. This results in enhancing the user experience.

The electronic device switches from displaying a frame from one camera to a frame from another camera. The transition table contains pre-calculated and pre-calibrated information for various transitions (e.g., wide to ultra-wide, tele to wide, wide to tele, etc.). The information includes precise switching delay, FOV of lenses, color and saturation profiles of the cameras, etc. The electronic device utilizes the frames from the single camera and the transition table to generate a final output of intermediate frames. For example, the electronic device computes an interval between successive frames, the scale and position transformation for each generated frame, the color correction for each frame, and the photometric correction for each frame. This results in enhancing the user experience.

FIG. 1 is an example illustration showing a process by which an electronic device (100) switches between a first lens and a second lens, according to an embodiment. The electronic device (100) can be, for example, but not limited to a cellular phone, a smart phone, a Personal Digital Assistant (PDA), a tablet computer, a laptop computer, a smart watch, an Internet of Things (IoT) device, a multi-camera system or the like. The first lens and the second lens can be, for example, but not limited to a wide lens, an ultra-wide lens, a tele-lens or the like.

In an embodiment, the electronic device (100) is configured to display a first frame showing a FOV of the first lens. Further, the electronic device (100) is configured to detect an event to switch from the first lens to the second lens. Further, the electronic device (100) is configured to generate at least one intermediate frame for smooth transformation from the first lens to the second lens.

In an embodiment, the at least one intermediate frame is generated for smooth transformation from the first lens to the second lens by determining a lens switching delay from a first frame showing the FOV of the first lens to a second frame showing a FOV of the second lens, detecting at least one lens transition parameter to generate the at least one intermediate frame, obtaining at least one of a spatial alignment data, a photometric alignment data and a color alignment data, and generating the at least one intermediate frame between the first frame and the second frame based on the at least one lens transition parameter, the lens switching delay, and at least one of the spatial alignment data, the photometric alignment data and the color alignment data.

In an embodiment, the spatial alignment data is obtained by capturing a single frame associated with the first lens and a single frame associated with the second lens when the electronic device (100) is in an idle mode, resizing the single frame associated with the first lens and the single frame associated with the second lens into a preview resolution size, computing feature points in the single frame associated with the first lens and the single frame associated with the second lens, computing a transformation matrix using a Homography relationship between the single frame associated with the first lens and the single frame associated with the second lens, wherein the transformation matrix includes a scaling of the single frame associated with the first lens and the single frame associated with the second lens, a rotation of the single frame associated with the first lens and the single frame associated with the second lens and a translation of the of the single frame associated with the first lens and the single frame associated with the second lens, and obtaining the spatial alignment data using the transformation matrix. The detailed operations of the spatial alignment procedure are explained in FIG. 14.

In an embodiment, the photometric alignment data is obtained by computing a transformation matrix for the generated frame, computing a correction factor based on the transformation matrix, and obtaining the photometric alignment data based on the correction factor. The detailed operations of the photometric alignment procedure are explained in FIG. 15.

In an embodiment, the color alignment data is obtained by computing a transformation matrix for the generated frame, computing a correction factor for the color alignment data based on the transformation matrix, and obtaining the color alignment data based on the correction factor. The detailed operations of the color alignment procedure are explained in FIG. 16.

In an embodiment, the at least one lens transition parameter is an F-value of the first lens, a FOV of the first lens, a color profile of the first lens, a saturation profile of the first lens, an F-value of the second lens, a FOV of the second lens, a color profile of the second lens, a saturation profile of the second lens, a scale factor between the first lens and the second lens, a single scale factor of a combination of the first lens and the second lens, a pivot between the first lens and the second lens, and a single pivot value of a combination of the first lens and the second lens.

In an embodiment, the at least one intermediate frame is at least one of spatially aligned with respect to the first frame and the second frame, photometrically aligned with respect to the first frame and the second frame and color aligned with respect to the first frame and the second frame. The detailed operations of the intermediate frames generated for smooth transformation from the first lens (150) to the second lens (160) are explained in FIG. 13.

Further, the electronic device (100) is configured to switch from the first lens to the second lens and display the second frame showing the FOV of the second lens. The at least one intermediate frame is displayed between the first frame and the second frame while the switching is performed. In other words, the at least one intermediate frame is displayed after the first frame is displayed and before the second frame is displayed.

In an embodiment, the at least one intermediate frame to be generated is determined by determining the spatial alignment data using the lens transition parameter, and determining the at least one intermediate frame to be generated based on the determined spatial alignment data and the lens transition parameter.

Figure 6:
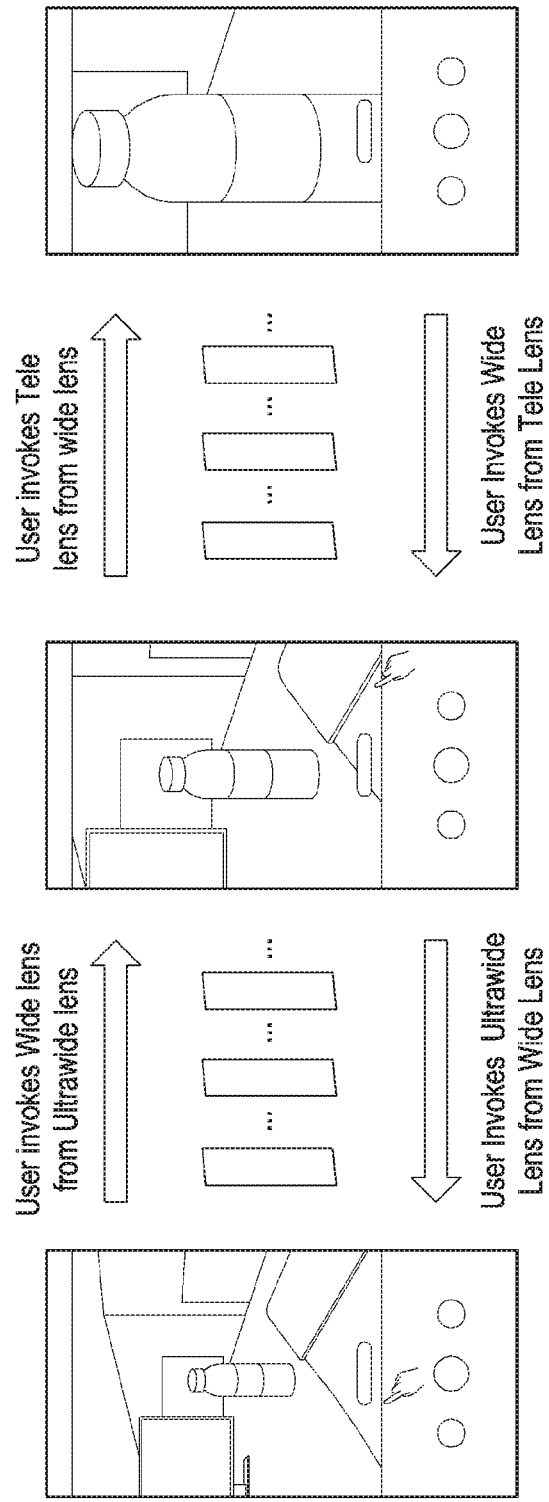
FIG. 6 and FIG. 7 are example scenarios in which seamless transition between the lenses are depicted, according to an embodiment.
Figure 7:
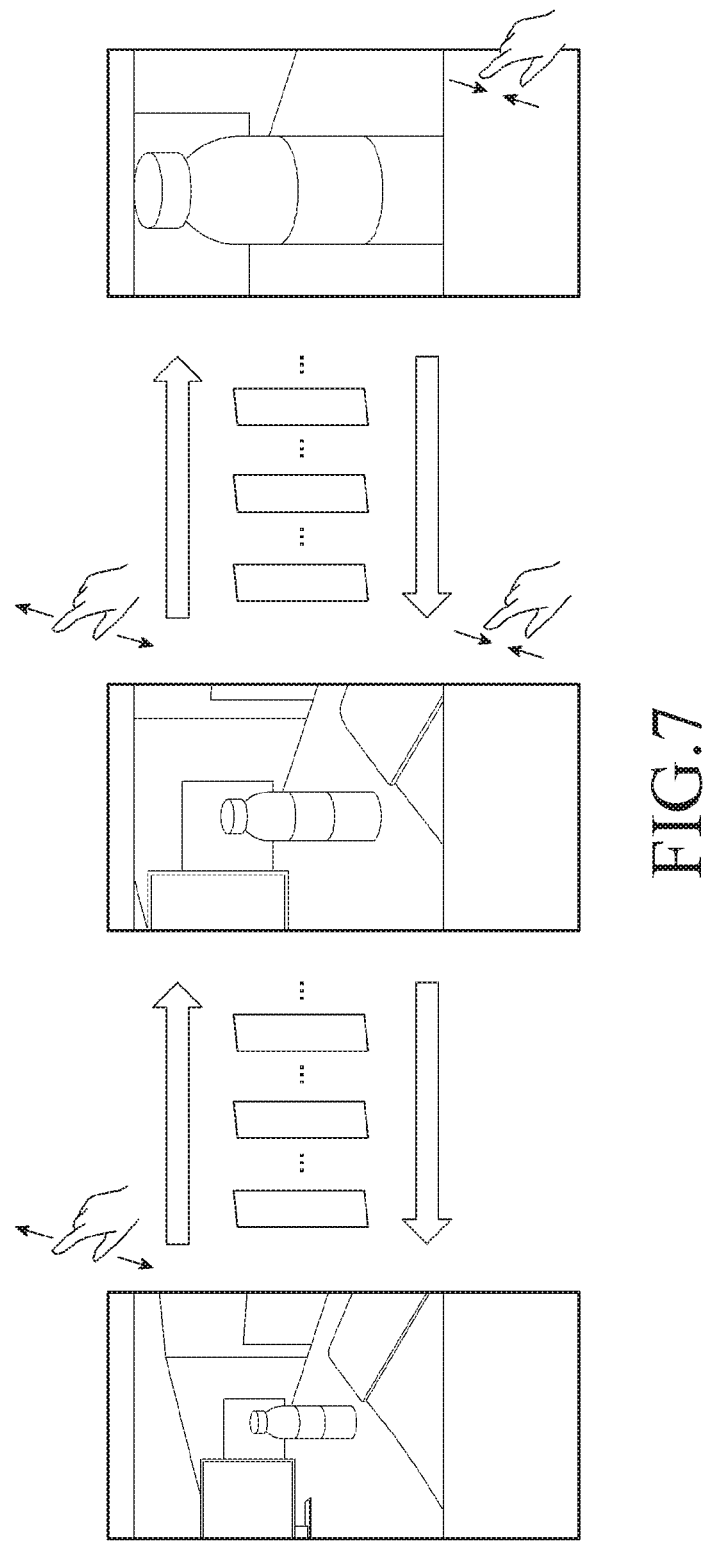

In an embodiment, the seamless transitions between the lenses are illustrated in FIG. 6 and FIG. 7.

For example, as shown in FIG. 7, the user of the electronic device (100) invokes the pinch-in-zoom on the image with the wider FOV to cause a smooth transition to an image with a narrower FOV when enough details are not available in the wide FOV image. Similarly, the user of the electronic device (100) invokes the pinch-out-zoom on the image with the narrower FOV to cause a smooth transition to an image with wider FOV when enough details are not available in the narrow FOV image.

Figure 2:
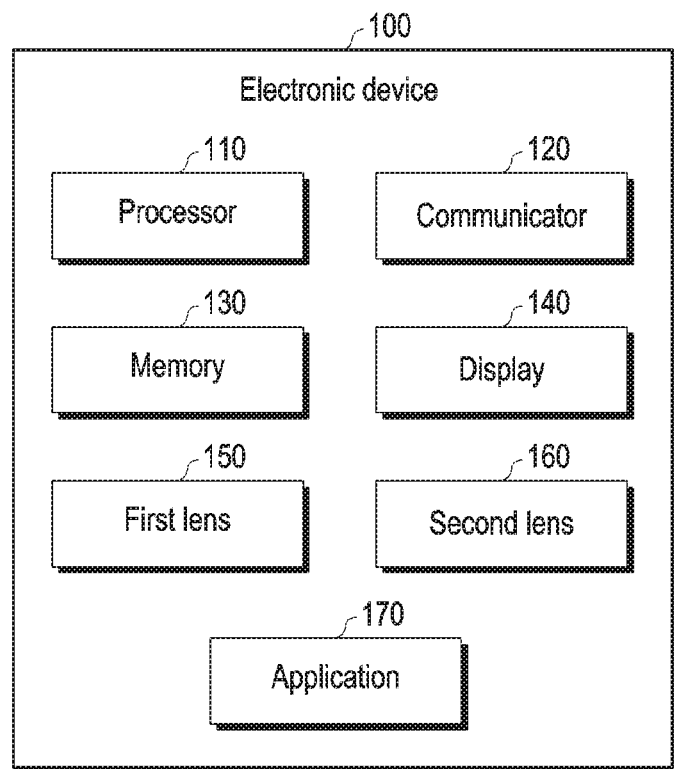
FIG. 2 shows various hardware components of the electronic device, according to an embodiment.

FIG. 2 shows various hardware components of the electronic device (100), according to an embodiment as disclosed herein. In an embodiment, the electronic device (100) includes a processor (110), a communicator (120), a memory (130), a display (140), the first lens (150), the second lens (160), and an application (170). The processor (110) is provided with the communicator (120), the memory (130), the display (140), the first lens (150), the second lens (160), and the application (170). The application (170) can be, for example, but not limited to a beauty related application, camera application, health related application or the like.

In an embodiment, the processor (110) is configured to display the first frame showing the FOV of the first lens (150). Further, the processor (110) is configured to detect an event that causes a switch from the first lens (150) to the second lens (160). Further, the processor (150) is configured to generate at least one intermediate frame for smooth transformation from the first lens (150) to the second lens (160). Further, the processor (110) is configured to switch from the first lens (150) to the second lens (160) and display the second frame showing the FOV of the second lens (160). The at least one intermediate frame is displayed, on the display (140), between the first frame and the second frame while the switching is performed. The at least one intermediate frame displayed on the display (140) may be visible to the user or it may not be visible to the user.

The processor (110) is configured to execute instructions stored in the memory (130) and to perform various processes. The communicator (120) is configured for communicating internally between internal hardware components and with external devices via one or more networks.

The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In some examples, the memory (130) can be configured to store larger amounts of information than the memory. In certain examples, a non-transitory storage medium may store data that can, over time, change (e.g., in Random Access Memory (RAM) or cache).

Although FIG. 2 shows various hardware components of the electronic device (100) but it is to be understood that other embodiments are not limited thereon. In other embodiments, the electronic device (100) may include fewer or more components. Further, the labels or names of the components are used only for illustrative purpose and do not limit the scope of the disclosure. One or more components can be combined together to perform the same or a substantially similar function to switch between the first lens (150) and the second lens (160) in the electronic device (100).

Figure 3:
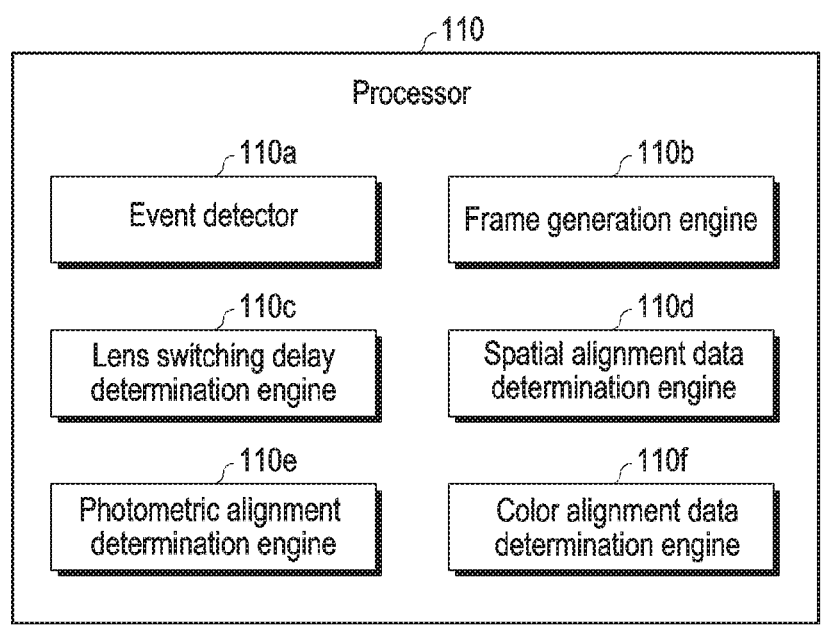
FIG. 3 shows various hardware components of a processor included in the electronic device, according to an embodiment.

FIG. 3 shows various hardware components of the processor (110) included in the electronic device (100), according to an embodiment. In an embodiment, the processor (110) includes an event detector (110a), a frame generation engine (110b), a lens switching delay determination engine (110c), a spatial alignment data determination engine (110d), a photometric alignment data determination engine (110e) and a color alignment data determination engine (1100.

In an embodiment, the event detector (110a) is configured to display the first frame showing the FOV of the first lens (150) and detect the event that causes the switch from the first lens (150) to the second lens (160). Further, the frame generation engine (110b) is configured to generate at least one intermediate frame for smooth transformation from the first lens (150) (i.e., from the first frame showing the FOV of the first lens) to the second lens (160) (i.e., to a second frame showing the FOV of the second lens) using the lens switching delay determination engine (110c), the spatial alignment data determination engine (110d), the photometric alignment data determination engine (110e) and the color alignment data determination engine (110f). Further, the frame generation engine (110b) is configured to switch from the first lens (150) to the second lens (160) and display the second frame showing the FOV of the second lens (160). The at least one intermediate frame is displayed between the first frame and the second frame while the switching is performed.

The spatial alignment data determination engine (110d) is configured to handle the spatial alignment mismatch between the first and second frames. The photometric alignment data determination engine (110e) is configured to handle the different exposure between the first and second frames. The color alignment data determination engine (1100 is configured to handle the color difference between the first and second frames.

Although FIG. 3 shows various hardware components of the processor (110), it is to be understood that other embodiments are not limited thereon. In other embodiments, the processor (110) may include fewer or more components. Further, the labels or names of the components are used only for illustrative purpose and do not limit the scope of the disclosure. One or more components can be combined together to perform the same or a substantially similar function to switch between the first lens (150) and the second lens (160) in the electronic device (100).

Figure 4:
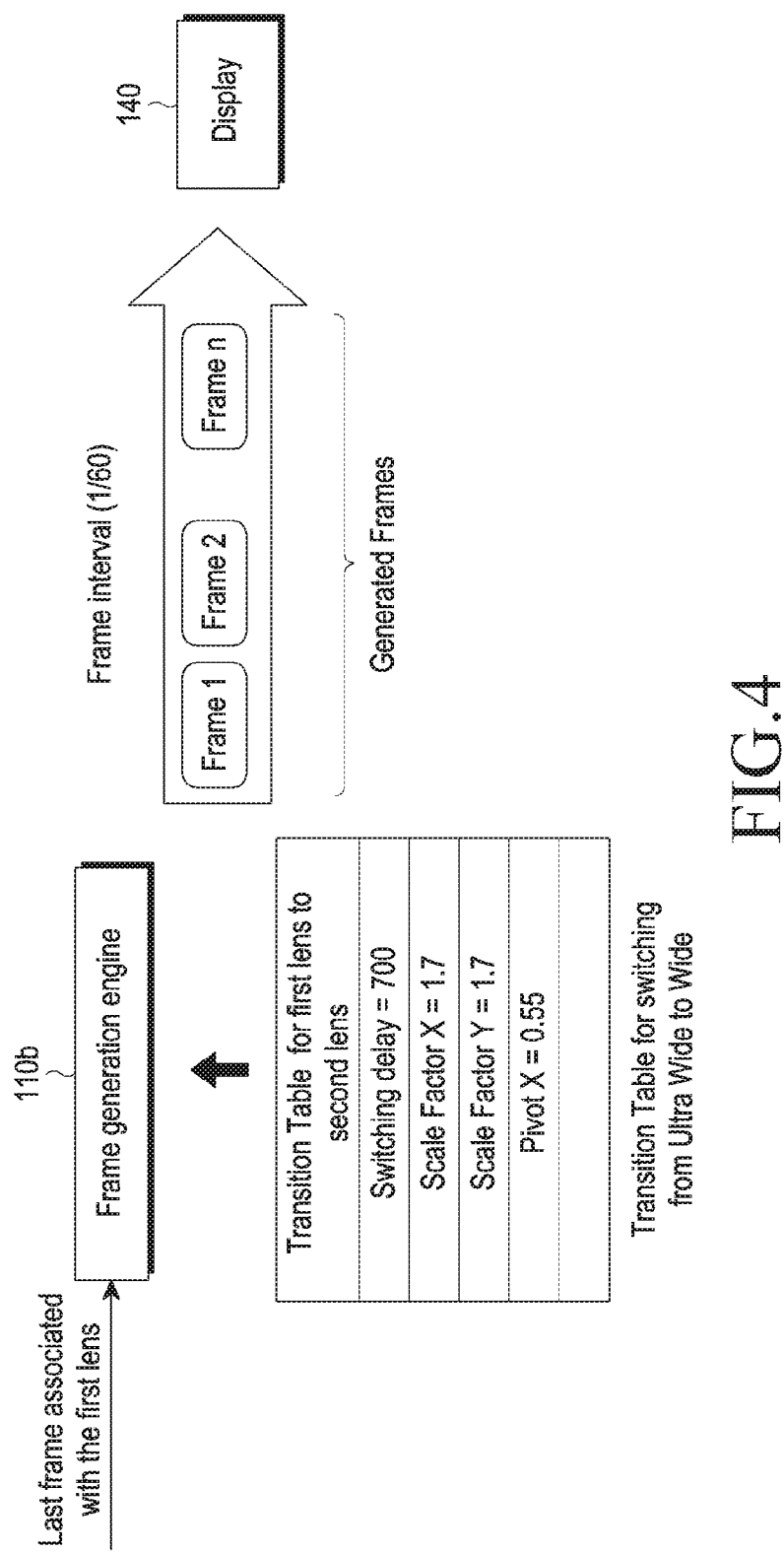
FIG. 4 is an example scenario in which a frame generation engine computes a number of frames to be generated, according to an embodiment.

FIG. 4 is an example scenario in which the frame generation engine (110b) computes a number frames to be generated, according to an embodiment. The frame generation engine (110b) utilizes a transition table which holds pre-calculated and pre-calibrated information for various transitions (e.g., wide lens to ultra-wide lens, tele-lens to wide lens, wide lens to tele-lens, etc.). The information includes switching delay, scale factor, color and saturation profiles of the lenses (150 and 160), etc. Using the transition table, the frame generation engine (110b) computes the number frames to be generated for display.

In an example, the transition tables 1-6 are example tables for the electronic device with three lenses (e.g., Ultra-wide lens, wide lens, tele-lens or the like). For each combination of lens transition the transition table shows the corresponding transition parameters used in the transition. A brief explanation follows of the parameters shown in the transition table.

The "Enabled" parameter indicates whether the transition table is enabled or disabled (depending a lens configuration of the electronic device (100)). The "Switching delay" parameter indicates a delay between the frame of the source lens and the frame of the target lens. The "Scale Factor X" parameter indicates an X Scale factor between the source lens and the target lens. The "Scale Factor Y" parameter indicates a Y Scale factor between source and target lens. The "Pivot X" parameter indicates an X value of the pivot point for transition between source and target lens frames. The "Pivot Y" parameter indicates a Y value of the pivot point for transition between source and target lens frames. The "Brightness" parameter indicates a Brightness profile of the target lens frame, expressed in terms of mean and standard deviation. The "Color" parameter indicates a Color profile of the target lens frame, expressed in terms of mean and standard deviation. The pivot point is the point between source and target lens frames which remains constant during transition and may be specified using X and Y coordinates.

| Transition Table 1 for Ultra-wide lens to Wide lens | |
|---|---|
| Ultra-wide lens to Wide lens | |
| Enabled | True |
| Switching delay | 700 |
| Scale Factor X | 1.6 |
| Scale Factor Y | 1.6 |
| Pivot X | 0.55 |
| Pivot Y | 0.5 |
| Brightness | 1.2, 0.2 |
| Color | 1.1, 0.1 |

| Transition Table 2 for Ultra-wide lens to Tele-lens | |
|---|---|
| Ultra-wide lens to Tele-lens | |
| Enabled | True |
| Switching delay | 700 |
| Scale Factor X | 2.77 |
| Scale Factor Y | 2.77 |
| Pivot X | 0.55 |
| Pivot Y | 0.5 |
| Brightness | 1.25, 0.2 |
| Color | 1.15, 0.2 |

| Transition Table 3 for Wide lens to Tele-lens | |
|---|---|
| Wide lens to Tele-lens | |
| Enabled | True |
| Switching delay | 800 |
| Scale Factor X | 1.73 |
| Scale Factor Y | 1.73 |
| Pivot X | 0.55 |
| Pivot Y | 0.5 |
| Brightness | 1.25, 0.2 |
| Color | 1.15, 0.2 |

| Transition Table 4 for Wide lens to Ultra-wide lens | |
|---|---|
| Wide lens to Ultra-wide lens | |
| Enabled | True |
| Switching delay | 750 |
| Scale Factor X | 0.625 |
| Scale Factor Y | 0.625 |
| Pivot X | 0.55 |
| Pivot Y | 0.5 |
| Brightness | 1.2, .02 |
| Color | 1.1, 0.2 |

| Transition Table 5 for Tele-lens to Ultra-wide lens | |
|---|---|
| Tele-lens to Ultra-wide lens | |
| Enabled | True |
| Switching delay | 650 |
| Scale Factor X | 0.361 |
| Scale Factor Y | 0.361 |
| Pivot X | 0.55 |
| Pivot Y | 0.5 |
| Brightness | 1.25, 0.2 |
| Color | 1.15, 0.2 |

| Transition Table 6 for Tele-lens to Wide lens | |
|---|---|
| Tele-lens to Wide lens | |
| Enabled | True |
| Switching delay | 700 |
| Scale Factor X | 0.578 |
| Scale Factor Y | 0.578 |
| Pivot X | 0.55 |
| Pivot Y | 0.5 |
| Brightness | 1.25, 0.2 |
| Color | 1.15, 0.2 |

The transition tables 1-6 are only examples and are provided for the purpose of understanding the transition parameters. Further, values for the transition tables 1-6 may be varied based on at least one of the user setting, an original equipment manufacturer (OEM), and a configuration of the electronic device (100).

Figure 5:
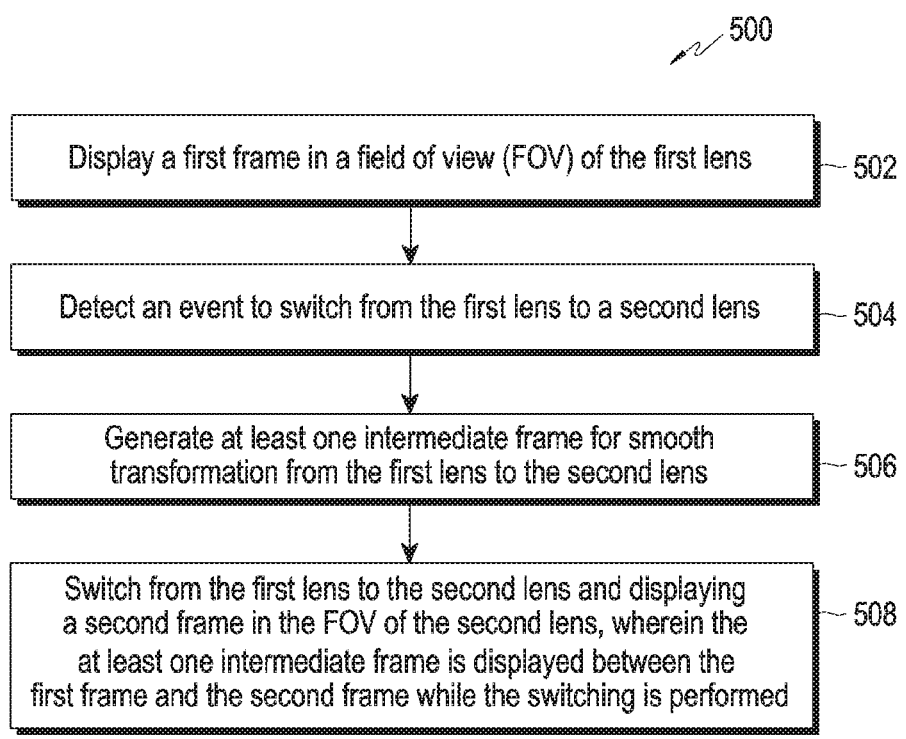
FIG. 5 is a flow chart illustrating a method for switching between the first lens and the second lens in the electronic device, according to an embodiment.

FIG. 5 is a flow chart (500) illustrating a method for switching between the first lens (150) and the second lens (160) in the electronic device (100), according to an embodiment. The operations (502-508) are performed by the processor (110).

At 502, the method includes displaying the first frame showing the FOV of the first lens (150). At 504, the method includes detecting the event that causes a switch from the first lens (150) to the second lens (160). At 506, the method includes generating at least one intermediate frame for smooth transformation from the first lens (150) to the second lens (160). At 508, the method includes switching from the first lens (150) to the second lens (160) and displaying the second frame showing the FOV of the second lens (160). The at least one intermediate frame is displayed between the first frame and the second frame while the switching is performed.

Figure 8:
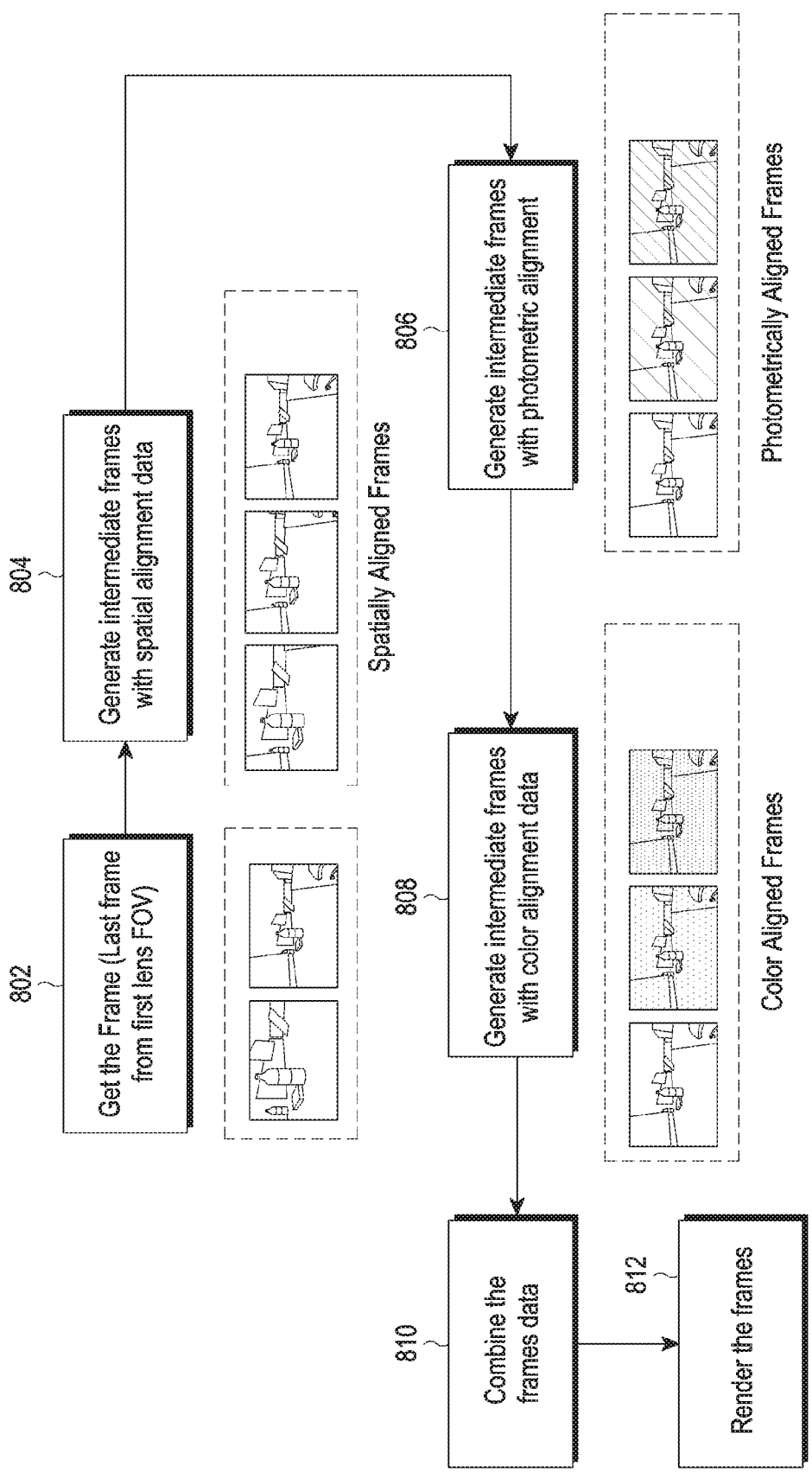
FIG. 8 is an example flow chart illustrating various operations for switching between the first lens and the second lens in the electronic device, according to an embodiment.

FIG. 8 is an example flow chart illustrating various operations for switching between the first lens (150) and the second lens (160) in the electronic device (100), according to an embodiment. At 802, the electronic device (100) obtains the frame (i.e., the last frame from the first lens FOV and the first frame from the second lens FOV). At 804, the electronic device (100) generates the intermediate frames with the spatial alignment data based on the last frame of the first lens FOV and first frame of the second lens FOV. At 806, the electronic device (100) generates intermediate frames with the photometric alignment data. At 808, the electronic device (100) generates intermediate frames with the color alignment data. At 810, the electronic device (100) combines the frames. At 812, the electronic device (100) renders the frames.

Figure 9:
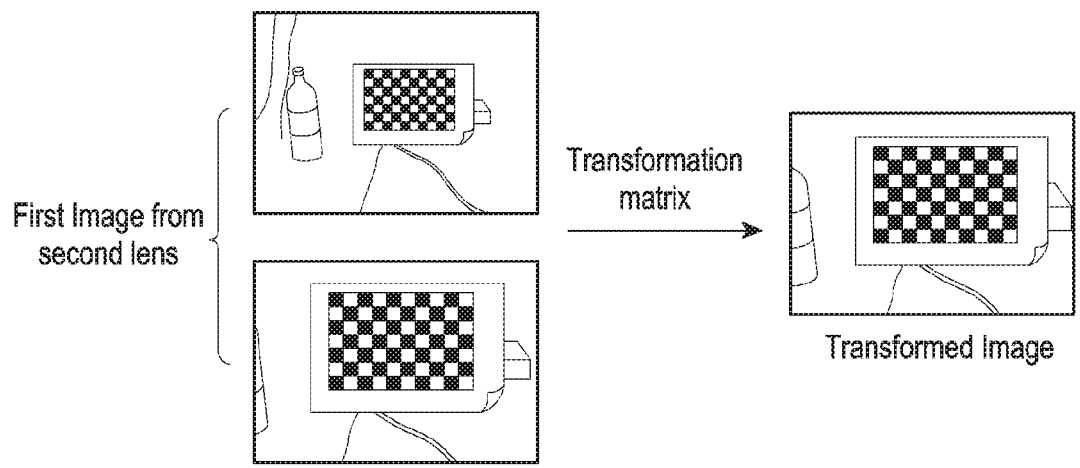
FIG. 9 is an example scenario in which the electronic device computes the spatial alignment data, according to an embodiment.

FIG. 9 is an example scenario in which the electronic device (100) computes the spatial alignment data, according to an embodiment.

For example, the electronic device (100) captures the pair of wide and ultra wide frames keeping the electronic device (100) stationary. Further, the electronic device (100) resizes both images to preview resolution. Further, the electronic device (100) computes corner points in both images. Further, the electronic device (100) computes the transformation matrix using Homography. Here, the Homography is a transformation matrix (e.g., a 3×3 matrix) that maps the points in one image to the corresponding points in the other image. When applied to the source frame data, the transformation matrix effects scaling, rotation and translation of the source frame data. For spatial alignment, the electronic device (100) needs scale and pivot data. Further, the electronic device (100)

constructs the transformation matrix using only scale and pivot data. In an example, below matrix is used for computing the spatial alignment data.

$$\begin{bmatrix} 1 & 0 & p_x \\ 0 & 1 & p_y \\ 0 & 0 & 1 \end{bmatrix} \cdot \begin{bmatrix} s_x & 0 & 0 \\ 0 & s_y & 0 \\ 0 & 0 & 1 \end{bmatrix} \cdot \begin{bmatrix} 1 & 0 & p_x \\ 0 & 1 & p_y \\ 0 & 0 & 1 \end{bmatrix} = \begin{bmatrix} s_x & 0 & p_x(1-s_x) \\ 0 & s_y & p_y(1-s_y) \\ 0 & 0 & 1 \end{bmatrix} \leftrightarrow \begin{bmatrix} s_x & 0 & t_x \\ 0 & s_y & t_y \\ 0 & 0 & 1 \end{bmatrix}$$

In this example, $s_x$ and $s_y$ represent scale factors X and Y and $p_x$ and $p_y$ represent pivot factors X and Y as described with reference to the Transition Tables above.

Figure 10:
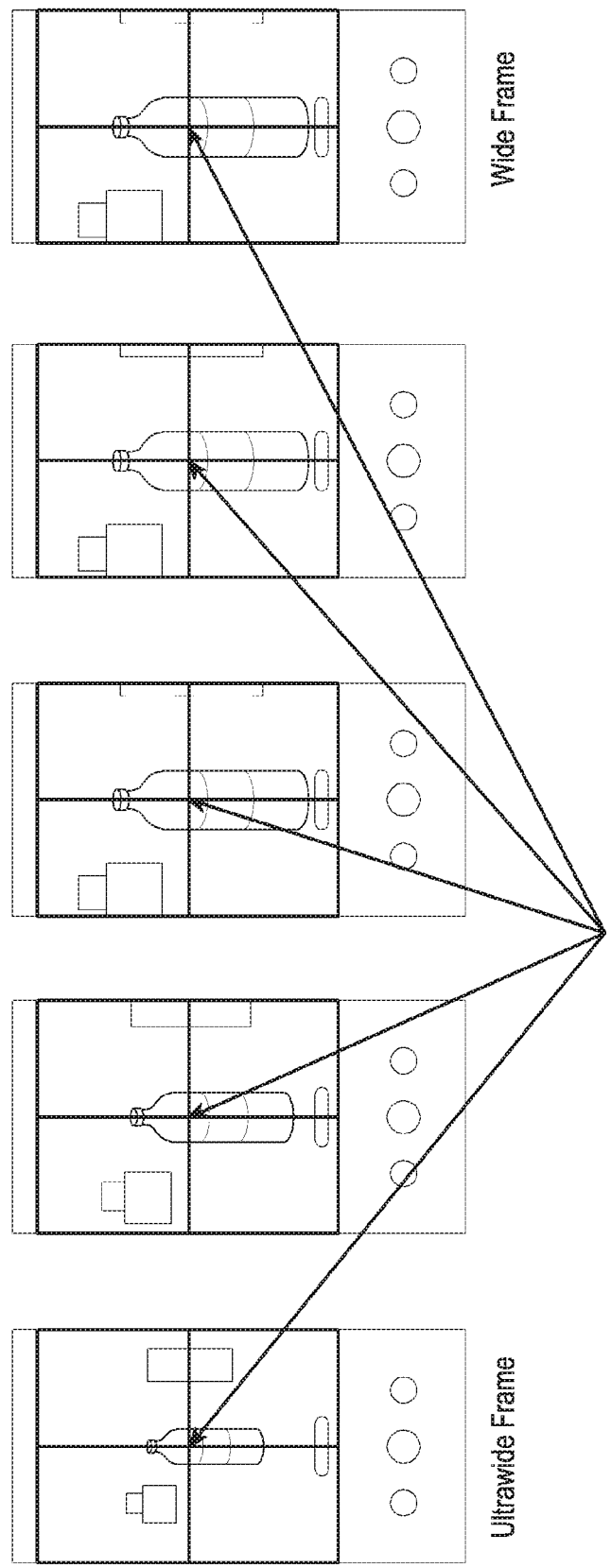
FIG. 10 is an example scenario in which the electronic device computes the spatial alignment data with respect to position (i.e., frame center alignment) and scale (i.e., size of objects), according to an embodiment.

FIG. 10 is an example scenario in which the electronic device (100) computes the spatial alignment data with respect to position (i.e., frame center alignment) and scale (i.e., size of objects), according to an embodiment.

The center point of the frame is different in the Ultra-wide frame and the wide frame (for example, the crosshair position on the displayed bottle is different in the Ultra-wide frame and the wide frame). In an embodiment, the spatial alignment data gradually shifts the center from the Ultra-wide center to the wide center using the generated intermediate frames. The scale of the Ultra-wide frame and the wide frame are different (for example, the size of the bottle is smaller in the Ultra-wide frame than in the wide frame). Hence, the scale as well is shifted gradually from the Ultra-wide scale to the wide scale using the generated intermediate frames.

Figure 11:
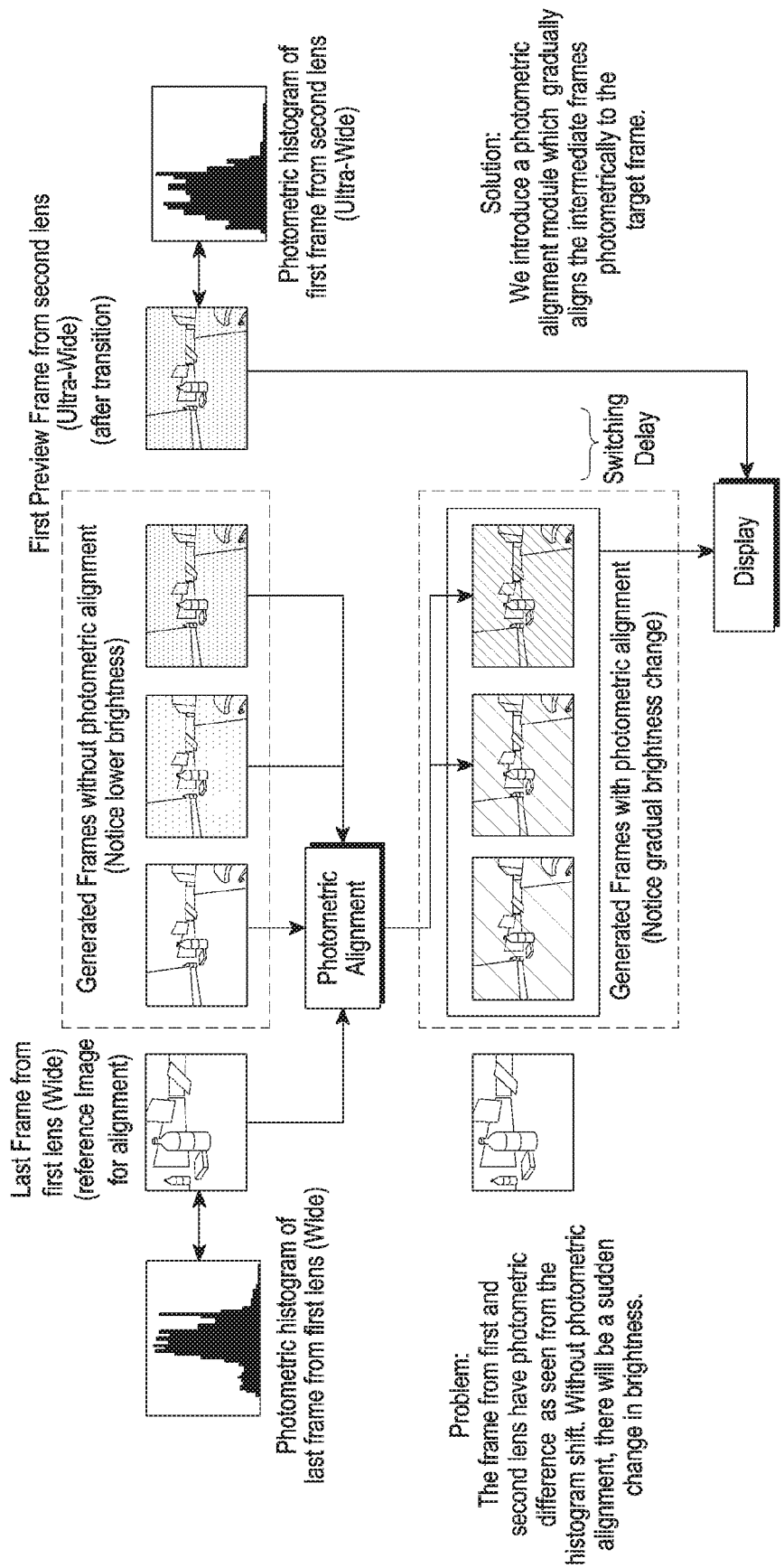
FIG. 11 is an example scenario in which the electronic device computes the photometric alignment data, according to an embodiment.

FIG. 11 is an example scenario in which the electronic device (100) computes the photometric alignment data, according to an embodiment.

In the left side, the photometric histogram of the last frame from the first lens (i.e., a wide lens) is shown. The last frame from the first lens is used as a reference image for photometric alignment. In the right side, the first preview frame from the second lens (i.e., the ultra-wide lens) is shown. As shown in FIG. 11, the photometric histogram of the first preview frame from the second lens is different from the photometric histogram of the last frame from the first lens. The electronic device (100) gradually aligns the intermediate frames photometrically to the target frame using the photometric alignment data determination engine (110e). The frames from the first lens and the second lens are photometrically different as seen from the histogram shift. Without photometric alignment, there will be a sudden change in brightness.

Figure 12:
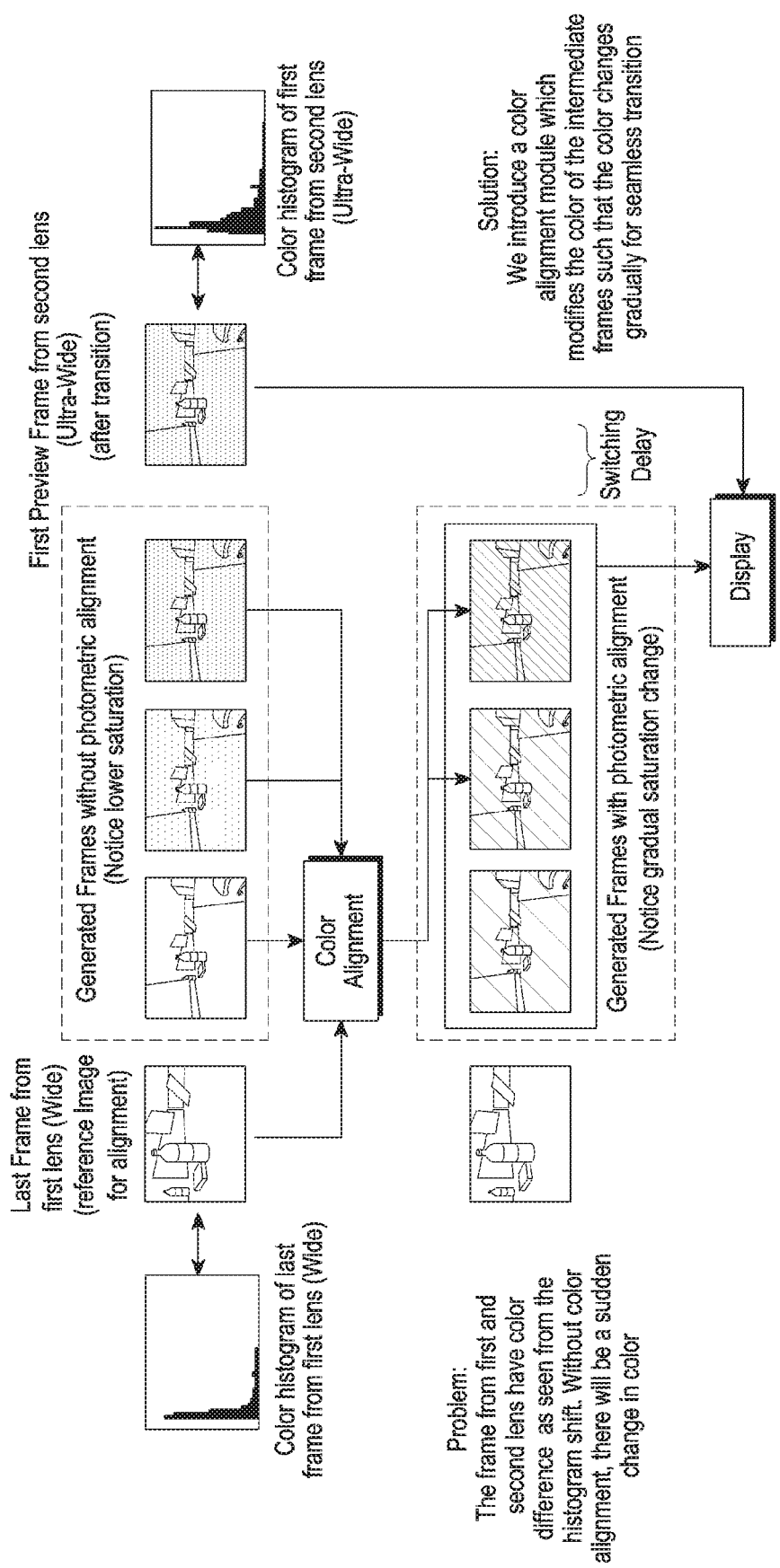
FIG. 12 is an example scenario in which the electronic device determines the color alignment data, according to an embodiment.

FIG. 12 is an example scenario in which the electronic device (100) determines the color alignment data, according to an embodiment.

Consider, the reference image for the color alignment data is shown in the left side of the FIG. 12 (i.e., last frame from the first lens (i.e., wide lens). The electronic device (100) generates the frames without photometric alignment with lower saturation. After transition, the electronic device (100) shows the first preview frame from the second lens (i.e., Ultra-Wide lens). The electronic device (100) generates the frames with photometric alignment data along with gradual saturation change. The electronic device (100) modifies the color of the intermediate frames such that the color changes gradually for seamless transition using the color alignment data determination engine (1100.

Figure 13:
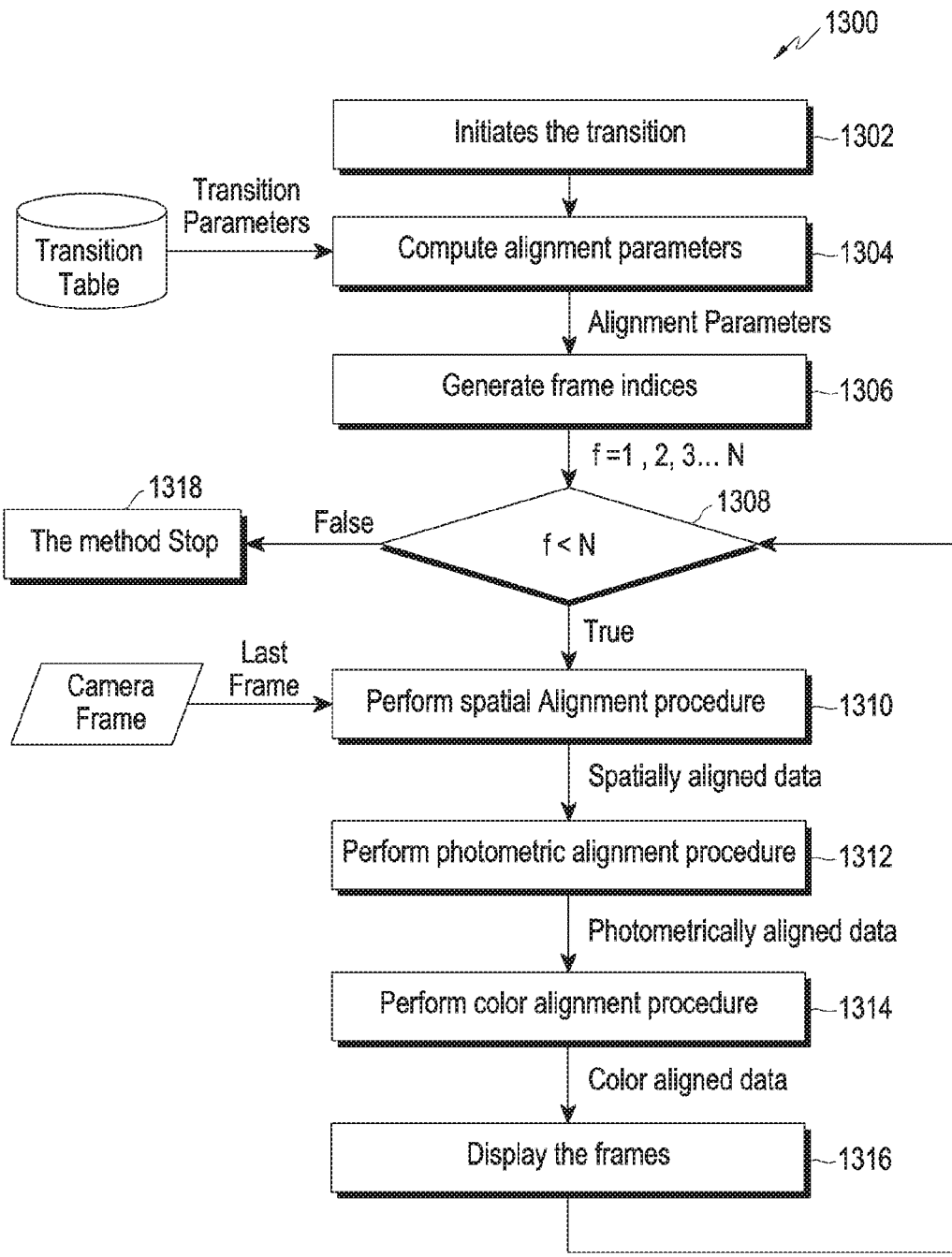
FIG. 13 is an example flow chart illustrating various operations for generating the intermediate frames for smooth transformation from the first lens to the second lens, according to an embodiment.

FIG. 13 is an example flow chart (1300) illustrating various operations for generating the intermediate frames for smooth transformation from the first lens (150) to the second lens (160), according to an embodiment. The operations (1302-1318) are performed by the frame generation engine (110b).

At 1302, the user of the electronic device (100) initiates a smooth transformation from the first lens (150) to the second lens (160). At 1304, the electronic device (100) computes the alignment parameters using the lens transition parameter from a corresponding transition table. At 1306, the electronic device (100) generates frame indices for each of the intermediate frames to be generated. The number of intermediate frames N to be generated is determined based on a switching delay (TSD) and a target frame rate (FPS) as described below with reference to FIG. 14. At 1308, the electronic device (100) compares a frame number to a frame number N of a last frame. If the frame number is not less than that of the last frame, at 1318, the method will stop. If the frame number is less than that of the last frame, then at 1310, the electronic device (100) performs the spatial alignment procedure. At 1312, the electronic device (100) performs the photometric alignment procedure. At 1314, the electronic device (100) performs the perform color alignment procedure. At 1316, the electronic device (100) displays the frames by combining the frames after performing the spatial alignment procedure, the photometric alignment procedure, and the color alignment procedure.

Figure 14:
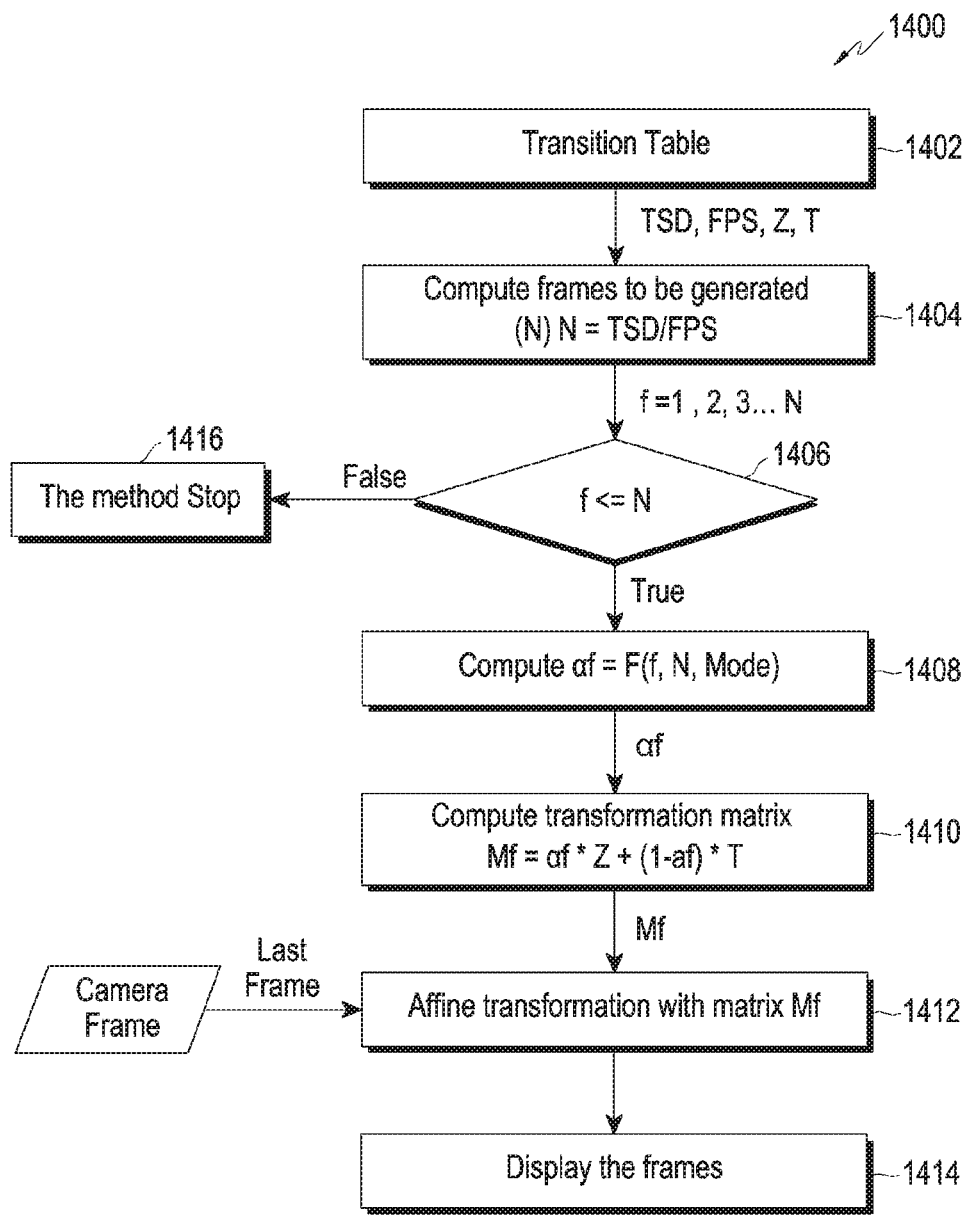
FIG. 14 is an example flow chart illustrating various processes for performing the spatial alignment procedure, according to an embodiment.

FIG. 14 is an example flow chart (1400) illustrating various processes for performing the spatial alignment procedure, according to an embodiment. The operations (1402-1416) are performed by the spatial alignment data determination engine (110d).

At 1402, the electronic device (100) obtains the transition table information. At 1404, the electronic device (100) computes the number of frames to be generated (i.e., N=TSD/FPS). At 1406, the electronic device (100) determines whether a frame number is greater than that of a last frame. If the frame number is greater than that of the last frame, at 1416, the method will stop. If the frame number is not greater than last frame, then at 1408, the electronic device (100) computes $\alpha f$ (i.e., $\alpha f = F(f, N, Mode)$). Here, the term $\alpha f$ is a coefficient to be used when determining the transformation matrix for frame f. For frame f and total number of frames N, $\alpha f = (N-f)/N$. At 1410, the electronic device (100) computes the transformation matrix (i.e., $Mf = \alpha f * Z + (1-\alpha f) * T$). Here, the matrix Z is the transformation matrix for frame 0 and the matrix T is the transformation matrix for frame N as described below. At 1412, the electronic device (100) performs an affine transformation with the determined transformation matrix. At 1414, the electronic device (100) displays the frames.

In an example, working of the frame generation engine (110b) with respect to the spatial alignment data is illustrated below:

Spatial Alignment Example:

The transformation matrix may be computed using the at least one lens transition parameter identified from the transition table information.

Consider, the switching delay (ms): $T_{SD}$, Target Frame Rate (FPS): F, then Frames to be generated (N)=$T_{SD}$/F Transformation matrix for Frame 0

$$(Z) = \begin{bmatrix} 1 & 0 & 0 \\ 0 & 1 & 0 \\ 0 & 0 & 1 \end{bmatrix}$$

Transformation matrix for Frame $$N(T) = \begin{bmatrix} s_x & 0 & p_x(1-sx) \\ 0 & s_y & p_y(1-sy) \\ 0 & 0 & 1 \end{bmatrix}$$

Then, the transformation matrix for each generated frame is, $$M_f = \alpha f * Z + (1-\alpha f) * T$$

Where, f is frame number and $\alpha_f$=F(f, N, Mode)

Consider an example wherein $T_{SD}$=720 ms, F=60 fps, then N=(720/60)=12, and $$Z = \begin{bmatrix} 1 & 0 & 0 \\ 0 & 1 & 0 \\ 0 & 0 & 1 \end{bmatrix}, T = \begin{bmatrix} 1.62 & 0 & -0.25 \\ 0 & 1.62 & -0.18 \\ 0 & 0 & 1 \end{bmatrix}$$

$\alpha_1$=0.92, $\alpha_2$=0.83, $\alpha_3$=0.75 ... $\alpha_N$=0

Figure 15:
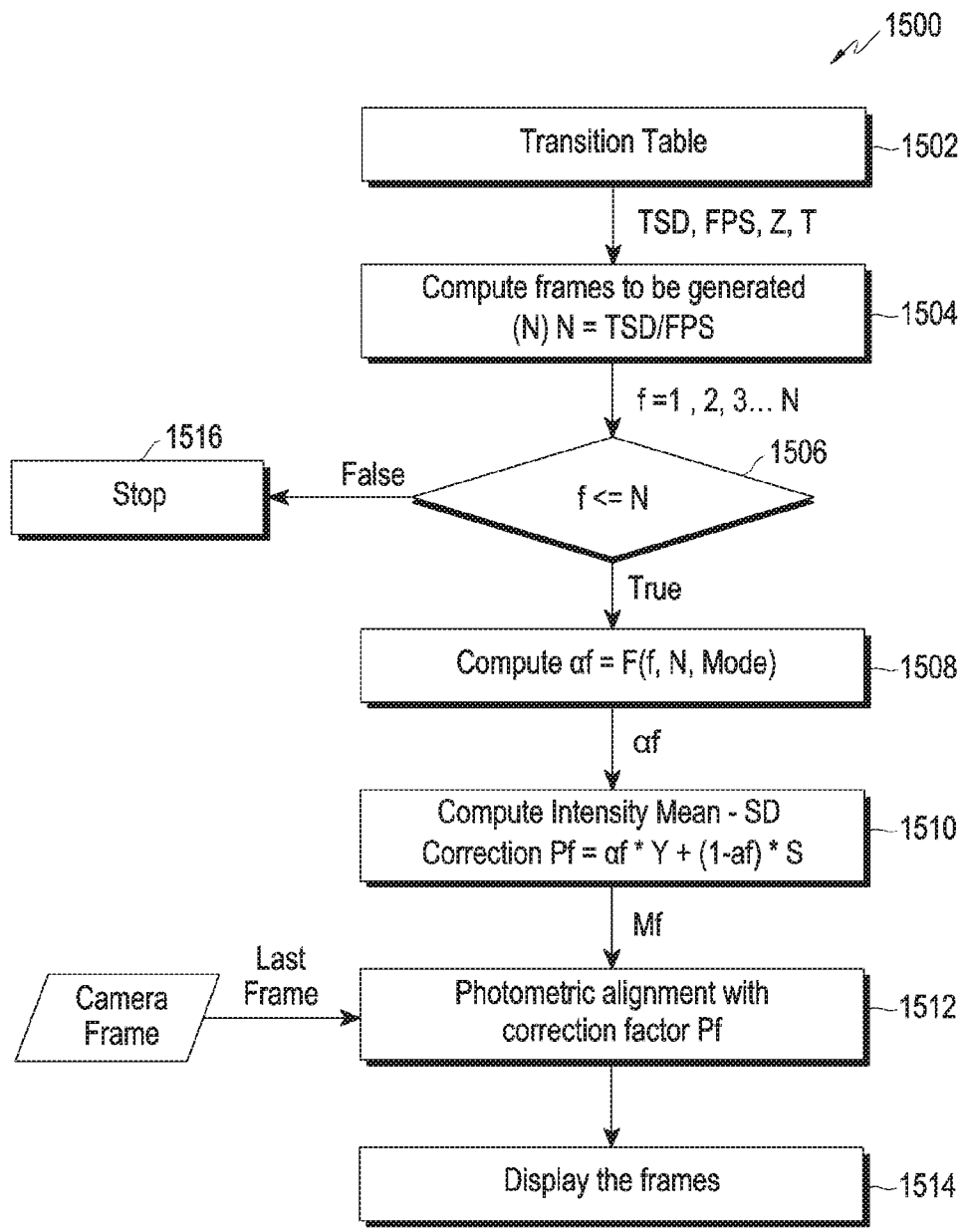
FIG. 15 is an example flow chart illustrating various processes for performing the photometric alignment procedure, according to an embodiment.

FIG. 15 is an example flow chart (1500) illustrating various processes for performing the photometric alignment procedure, according to an embodiment. The operations (1502-1516) are performed by the photometric alignment data determination engine (110e).

At 1502, the electronic device (100) obtains the transition table information. At 1504, the electronic device (100) computes the number of frames to be generated (i.e., N=TSD/FPS). At 1506, the electronic device (100) determines whether a frame number is greater than that of a last frame. If the frame number is greater than that of the last frame, at 1516, the method will stop. If the frame number is not greater than that of the last frame, then at 1508, the electronic device (100) computes αf (i.e., αf=F(f, N, Mode)). Here, the term αf is a coefficient to be used when determining the transformation matrix for frame f. For frame f and total number of frames N, αf=(N−f)/N. At 1510, the electronic device (100) computes the intensity mean-SD Correction Pf=αf*Y+(1−af)*S. Here, Y is the correction factor for frame 0 and S is the correction factor for frame N as described below. At 1512, the electronic device (100) provides the photometric alignment with the correction factor Pf. At 1514, the electronic device (100) displays the frames.

In an example, working of the frame generation engine (110b) with respect to the photometric alignment data is illustrated below:

Consider, switching delay (ms): $T_{SD}$, Target Frame Rate (FPS): F, Frames to be generated (N)=$T_{SD}$/F, Mean Correction factor: $C_{Mean}$, Standard Deviation Correction factor: $C_{STD}$ Correction factor for Frame 0 (Y): $Y_{mean}$=1.0, $Y_{STD}$=1.0 and Correction factor for Frame N (S): $S_{mean}$=$C_{Mean}$, $S_{STD}$=$C_{STD}$ Then the correction factor $P_f$ (i.e., [$P_{fMean}$, $P_{fSTD}$]) for each generated frame is, $$P_f = \alpha_f * Y + (1-\alpha_f) * S$$

Where, f is the frame number and $\alpha_f$=F(f, N, Mode)

Consider, $T_{SD}$=720 ms, F=60 fps, N=(720/60)=12, $\alpha_1$=0.92, $\alpha_2$=0.83, $\alpha_3$=0.75 ... $\alpha_N$=0

Using the above formula, correction factors $P_1$, $P_2$, $P_3$ ... $P_N$ for each intermediate frame may be computed.

Photometric alignment is applied for generating each intermediate frame according to the following relation:

$$L'f(x, y) = \left\{ PfMean + \left( \frac{L(x, y)}{LfMean} - 1 \right) PfSTD \right\} LfMean$$

where, $L_f$ is the intensity channel of the frame f

LfMean is the mean intensity of the frame f

The electronic device (100) applies the same logic for the color alignment data.

Figure 16:
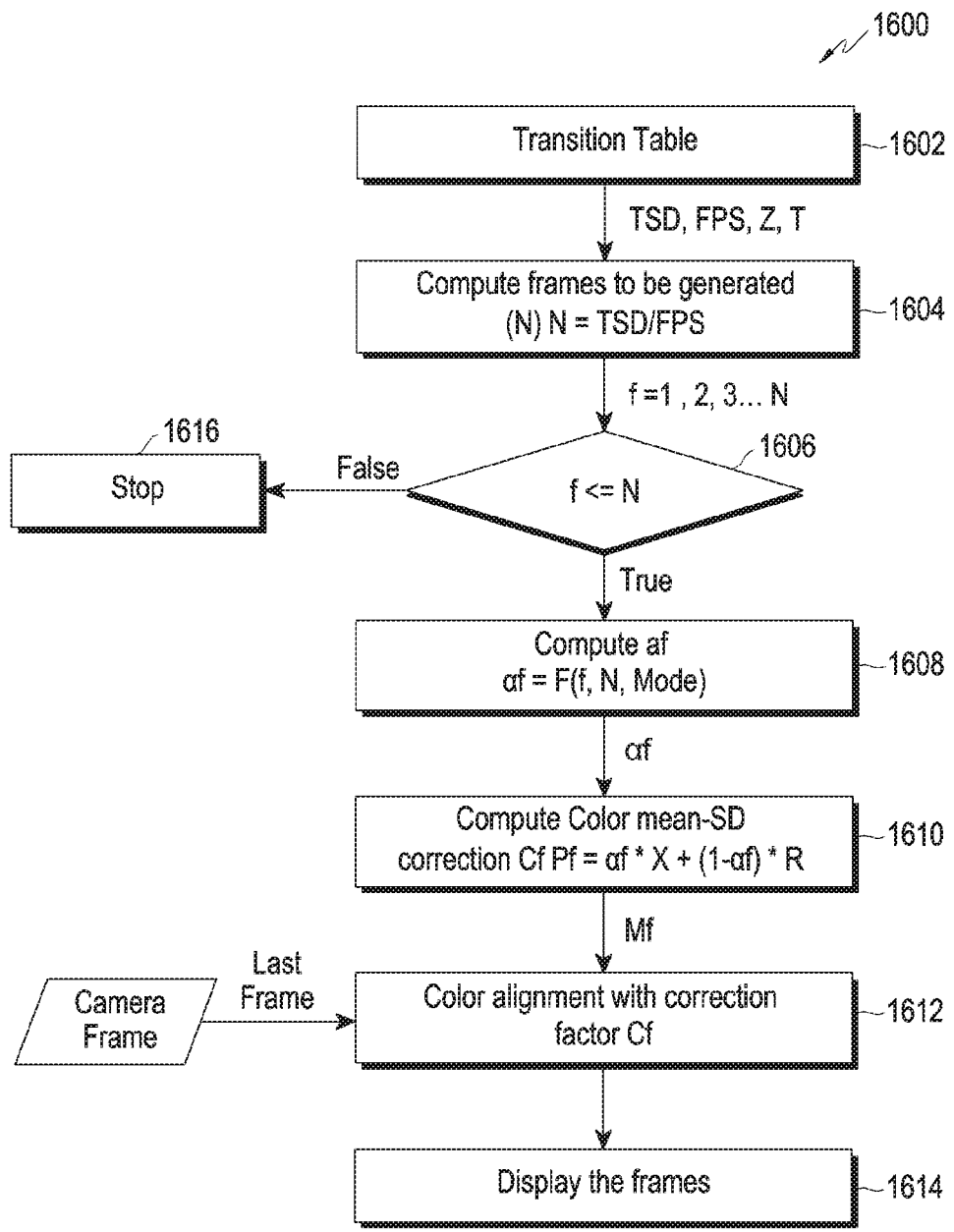
FIG. 16 is an example flow chart illustrating various processes for performing the color alignment procedure, according to an embodiment.

FIG. 16 is an example flow chart (1500) illustrating various processes for performing the color alignment procedure, according to an embodiment. The operations (1602-1616) are performed by the color alignment data determination engine (1100.

At 1602, the electronic device (100) obtains the transition table information. At 1604, the electronic device (100) computes the number of frames to be generated (i.e., N=TSD/FPS). At 1606, the electronic device (100) determines whether a frame number is greater than that of a last frame. If the frame number is greater than that of the last frame, at 1616, the method will stop. If the frame number is not greater than that of the last frame, then at 1608, the electronic device (100) computes αf (i.e., αf=F(f, N, Mode)). Here, the term αf is a coefficient to be used when determining the transformation matrix for frame f. For frame f and total number of frames N, αf=(N−f)/N. At 1610, the electronic device (100) computes the color mean-SD correction Cf=αf*X+(1−af)*R. Here, X is the correction factor for frame 0 and R is the correction factor for frame N as described below. At 1612, the electronic device (100) provides the color alignment data with the correction factor Cf. At 1614, the electronic device (100) displays the frames.

Figure 17:
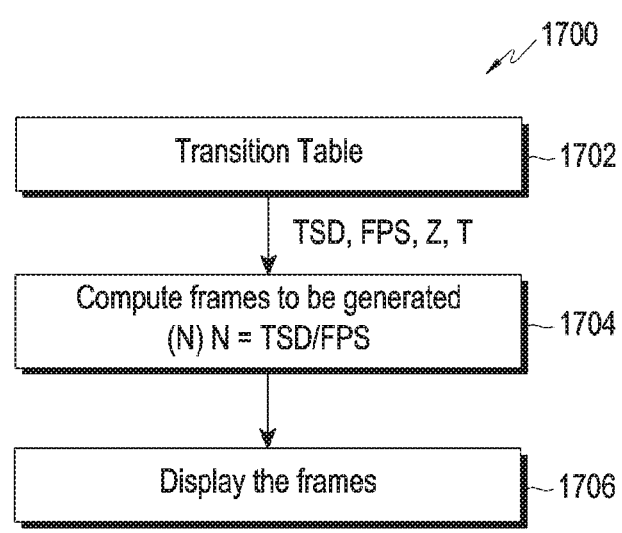
FIG. 17 is an example flow chart illustrating various processes for determining the number of frame generation, according to an embodiment.

FIG. 17 is an example flow chart (1700) illustrating various processes for determining the number of frames to be generated, according to an embodiment. The operations (1702-1706) are performed by the frame generation engine (110b).

At 1702, the electronic device (100) obtains the transition table information. At 1704, the electronic device (100) computes the number of frames to be generated (i.e., N=TSD/FPS). At 1706, the electronic device (100) displays the frames.

The various actions, acts, blocks, steps, or the like in the flow charts (500, 800, and 1300-1700) may be performed in the order presented, in a different order or simultaneously. Further, in some embodiments, some of the actions, acts, blocks, steps, or the like may be omitted, added, modified, skipped, or the like without departing from the scope of the disclosure.

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A method for switching between a first lens and a second lens in an electronic device, comprising:
displaying, by the electronic device, a first frame captured by the first lens showing a field of view (FOV) of the first lens, wherein the electronic device includes the first lens with the first FOV, the second lens with a second FOV greater than the first FOV, and a third lens with a third FOV greater than the first FOV and less than the second FOV;
detecting, by the electronic device, an event that causes the electronic device to transition from displaying the first frame to displaying a second frame showing a FOV of the second lens;
generating, by the electronic device and based on a switching delay which is determined based on a time difference between a first time at which the first frame is displayed and a second time at which the second frame is displayed, at least one intermediate frame for transitioning from the first frame to the second frame; and
switching, by the electronic device and based on the detecting the event, from the first lens to the second lens and displaying the second frame, wherein the at least one intermediate frame is displayed after the displaying the first frame and before the displaying of the second frame.

2. The method of claim 1, wherein the generating the at least one intermediate frame comprises:
identifying at least one transition parameter of the first lens and the second lens to generate the at least one intermediate frame;
obtaining at least one from among a spatial alignment data, a photometric alignment data and a color alignment data of the first lens and the second lens; and
generating the at least one intermediate frame further based on the at least one transition parameter, and at least one from among the spatial alignment data, the photometric alignment data and the color alignment data.

3. The method of claim 1, wherein the at least one intermediate frame is at least one from among spatially aligned with respect to the first frame and the second frame, photometrically aligned with respect to the first frame and the second frame and color aligned with respect to the first frame and the second frame.

4. The method of claim 2, further comprising determining the at least one intermediate frame to be generated,
wherein determining the at least one intermediate frame to be generated comprises:
determining the spatial alignment data using the at least one transition parameter; and
determining the at least one intermediate frame to be generated based on the determined spatial alignment data and the at least one transition parameter.

5. The method of claim 2, wherein the spatial alignment data is obtained by:
capturing a first single frame associated with the first lens and a second single frame of a same scene associated with the second lens when the electronic device is in an idle mode;
resizing the first single frame and the second single frame into a preview resolution size;
computing feature points in the first single frame and the second single frame;
computing a transformation matrix using the identified at least one transition parameter and a Homography relationship between the first single frame and the second single frame, wherein the transformation matrix includes a first scaling of the first single frame, a second scaling of the second single frame, a first rotation of the first single frame, a second rotation of the second single frame, a first translation of the first single frame, and a second translation of the second single frame; and
obtaining the spatial alignment data using the transformation matrix.

6. The method of claim 2, wherein the photometric alignment data is obtained by:
computing a transformation matrix for the generated at least one intermediate frame;
computing a correction factor based on the transformation matrix; and
obtaining the photometric alignment data based on the correction factor.

7. The method of claim 2, wherein the color alignment data is obtained by:
computing a transformation matrix for the generated at least one intermediate frame;
computing a correction factor for the color alignment data based on the transformation matrix; and
obtaining the color alignment data based on the correction factor.

8. The method of claim 2, wherein the at least one transition parameter includes an F-value of the first lens, the FOV of the first lens, a color profile of the first lens, a saturation profile of the first lens, an F-value of the second lens, the FOV of the second lens, a color profile of the second lens, a saturation profile of the second lens, a scale factor of the first lens, a scale factor of the second lens, a scale factor between the first lens and the second lens, a single scale factor of a combination of the first lens and the second lens, a pivot between the first lens and the second lens, and a single pivot value of a combination of the first lens and the second lens.

9. An electronic device for switching between a first lens and a second lens, comprising:
a memory;
a processor coupled with the memory, the processor being configured to:
display a first frame captured by the first lens showing a field of view (FOV) of the first lens, wherein the electronic device includes the first lens with the first FOV, the second lens with a second FOV greater than the first FOV, and a third lens with a third FOV greater than the first FOV and less than the second FOV;
detect an event that causes the electronic device to transition from displaying the first frame to displaying a second frame showing a FOV of the second lens;
generate, based on a switching delay which is determined based on a time difference between a first time at which the first frame is displayed and a second time at which the second frame is displayed, at least one intermediate frame for transitioning from the first frame to the second frame; and
switch, based on detecting the event, from the first lens to the second lens and display the second frame, wherein the at least one intermediate frame is displayed after the first frame is displayed and before the second frame is displayed.

10. The electronic device of claim 9, wherein the processor is further configured to:
   identify at least one transition parameter of the first lens and the second lens to generate the at least one intermediate frame;
   obtain at least one from among a spatial alignment data, a photometric alignment data and a color alignment data of the first lens and the second lens; and
   generate the at least one intermediate frame further based on the at least one transition parameter, and at least one from among the spatial alignment data, the photometric alignment data and the color alignment data.

11. The electronic device of claim 9, wherein the at least one intermediate frame is at least one from among spatially aligned with respect to the first frame and the second frame, photometrically aligned with respect to the first frame and the second frame and color aligned with respect to the first frame and the second frame.

12. The electronic device of claim 10, wherein the processor is further configured to:
   determine the spatial alignment data using the at least one transition parameter; and
   determine the at least one intermediate frame to be generated based on the determined spatial alignment data and the at least one transition parameter.

13. The electronic device of claim 10, wherein the processor is further configured to:
   capture a first single frame associated with the first lens and a second single frame of a same scene associated with the second lens when the electronic device is in an idle mode;
   resize the first single frame and the second single frame into a preview resolution size;
   compute feature points in the first single frame and the second single frame;
   compute a transformation matrix using the identified at least one transition parameter and a Homography relationship between the first single frame and the second single frame, wherein the transformation matrix includes a first scaling of the first single frame, a second scaling of the second single frame, a first rotation of the first single frame, a second rotation of the second single frame, a first translation of the of the first single frame, and a second translation of the second single frame; and
   obtain the spatial alignment data using the transformation matrix.

14. The electronic device of claim 10, wherein the photometric alignment data is obtained by:
   computing a transformation matrix for the generated at least one intermediate frame;
   computing a correction factor based on the transformation matrix; and
   obtaining the photometric alignment data based on the correction factor.

15. The electronic device of claim 10, wherein the color alignment data is obtained by:
   computing a transformation matrix for the generated at least one intermediate frame;
   computing a correction factor for the color alignment data based on the transformation matrix; and
   obtaining the color alignment data based on the correction factor.

16. The electronic device of claim 10, wherein the at least one transition parameter includes an F-value of the first lens, the FOV of the first lens, a color profile of the first lens, a saturation profile of the first lens, an F-value of the second lens, the FOV of the second lens, a color profile of the second lens, a saturation profile of the second lens, a scale factor of the first lens, a scale factor of the second lens, a scale factor between the first lens and the second lens, a scale factor of a combination of the first lens and the second lens, a pivot between the first lens and the second lens, and a single pivot value of a combination of the first lens and the second lens.

* * * * *